United States Patent
Krebs et al.

[11] Patent Number: 6,000,640
[45] Date of Patent: Dec. 14, 1999

[54] PROCESS AND DEVICE FOR THE DECOMPOSITION OF FIBROUS MATERIALS

[75] Inventors: Jochen Krebs, Ravensburg; Wolfgang Müller, Weingarten; Andreas Steidele; Klaus Steinbild, both of Ravensburg, all of Germany

[73] Assignee: Voith Sulzer Papiertechnik Patent GmbH, Ravensburg, Germany

[21] Appl. No.: 09/042,197

[22] Filed: Mar. 13, 1998

[30] Foreign Application Priority Data

Aug. 20, 1997 [DE] Germany .......................... 197 36 143

[51] Int. Cl.⁶ .......................... B02C 17/00; B02C 17/10
[52] U.S. Cl. .......................... 241/24.29; 241/27; 241/28; 241/29; 241/79.3; 241/183
[58] Field of Search .................. 241/15, 16, 21, 241/24.29, 27, 28, 29, 38, 79.2, 79.3, 183

[56] References Cited

U.S. PATENT DOCUMENTS

| 3,056,561 | 10/1962 | Hukki | 241/178 X |
| 3,589,977 | 6/1971 | Fournet | 241/28 X |
| 4,124,168 | 11/1978 | Bialski et al. | 241/14 |
| 4,538,767 | 9/1985 | Pimley | 241/79.3 |
| 4,699,324 | 10/1987 | Ahs | 241/21 |
| 5,047,118 | 9/1991 | Gullichsen | 241/28 X |
| 5,735,472 | 4/1998 | Serres et al. | 241/79.3 |

FOREIGN PATENT DOCUMENTS

| 0062988 | 10/1982 | European Pat. Off. . |
| 0218738 | 4/1987 | European Pat. Off. . |
| 3210503 | 12/1982 | Germany . |
| 82/01326 | 4/1982 | WIPO . |

OTHER PUBLICATIONS

Copy of a German Office Action dated Mar. 23, 1998.
Copy of a European Search Report dated Apr. 27, 1998.

*Primary Examiner*—John M. Husar
*Attorney, Agent, or Firm*—Greenblum & Bernstein, P.L.C.

[57] ABSTRACT

Process and device for decomposing fibrous material in an installation including a drum having an inner wall, a first end, and a second end, a displacer having an outer wall positioned inside the drum, and a processing channel formed between at least a portion of the outer wall and at least a portion of the inner wall. The process includes pouring fibrous material to be decomposed into the drum, relatively moving the outer wall relative to the inner wall in a peripheral direction of the drum, and mechanically processing the fibrous material in the processing channel.

35 Claims, 4 Drawing Sheets

PROCESS AND DEVICE FOR THE DECOMPOSITION OF FIBROUS MATERIALS

CROSS-REFERENCE TO RELATED APPLICATIONS

The present application claims priority under 35 U.S.C. § 119 of German Patent Application No.197 36 143.9, filed on Aug. 20, 1997, the disclosure of which is expressly incorporated by reference herein in its entirety.

BACKGROUND OF THE INVENTION

1. Field of the Invention

The present invention relates to a process and device for decomposing fibrous material.

In a particular example of the present invention, the device includes a drum having an inner wall, a first end and a second end, a displacer, having an outer wall, positioned inside the drum, and a processing channel formed between at least a portion of the outer wall and at least a portion of the inner wall. In a further example of the present invention, the process includes pouring fibrous material to be decomposed into the drum, moving the fibrous material from the first end to the second end, moving the inner wall relative to the outer wall in a peripheral direction of the drum, and mechanically processing the fibrous material in the processing channel.

2. Discussion of Background Information

Via a process similar in general to the above-noted type, contaminated, used paper is, in many cases, to be mixed with water and broken up. In the known processes, a decomposing drum, generally consisting of a cylinder in a horizontal position, which contains, for the most part, ring-shaped cover-plates on its front ends to avoid an undesirable escape of material, can be used in a first stage of the process. In the decomposing drum, water is added to the used paper to help break it up as is lifting, slipping, and falling or relative motions of the material segments to each other.

If sorting openings are provided in the jacket of the drum, the decomposed fibrous material can escape through them. Embodiments of such decomposition drums are illustrated and described, e.g., in German Patent Application No. DE-PS 32 10 503.

Processes for the treatment of used paper, which work with decomposing drums or similar devices discussed above, are known to have the advantage of an especially gentle decomposition, i.e., in regard to both sensitive types of fiber and undesired accompanying materials, which remain the ones to be sorted. However, the cost expenditure is a disadvantage in that this process can be used most favorably only with the kinds of used paper having a particularly simple decomposability, i.e., the used paper may not contain any parts of the kinds of paper which are difficult to decompose. The concepts of difficult and easy to decompose are well-known to the expert, such that newspaper paper is easily decomposed and "partial wet-strength," surface-treated, and "wet-strength" types of paper are difficult to decompose. The paper may also be discussed in terms of higher or lower decomposability. As a measure of decomposability, the specific work necessary during the decomposing process in the material decomposer to produce a slush is determined. For example, for newspaper paper, specific work amounts to about 15–20 kWh/t are necessary, while for liners or surface-treated paper, specific work amounts up to 80 kWh/t are necessary. For the reasons noted above, the process, in which decomposing drums, especially those that have proven reliable with so-called de-inking material, are used, the printed, sorted types of used paper are generally easy to decompose. However, even with this application, the decomposing drums have considerable dimensions.

SUMMARY OF THE INVENTION

The present invention provides a process that produces a good decomposing effect with robust and compact devices. Both easily decomposable and mixed types, even heavily contaminated used paper, may be processed without difficulty.

The present invention provides a process that includes pouring fibrous material to be decomposed into a drum, moving the fibrous material from a first end of the drum to a second end of the drum, moving an inner wall of the drum relative to an outer wall of a displacer located within the drum in a peripheral direction of the drum, and mechanically processing the fibrous material in a processing channel formed between a portion of the inner wall and a portion of the outer wall.

Through the features of the present invention, the processing chamber within the drum may be much better utilized. That is, in the processing channel, the fibrous material is decomposed especially effectively, without exerting forces beyond an inadmissible value. For example, the high tenacity (cohesiveness) of a highly consistent fibrous material of paper may be used such that the shearing forces are used for decomposition in the processing channels. Thus, the entire installation becomes more efficient and compact. If the displacer is perforated, so as to additionally sort the drum content, a further reduction of the necessary drum length may be attained.

The present invention is directed to a process for decomposing fibrous material in an installation including a drum having an inner wall, a first end, and a second end, a displacer having an outer wall positioned inside the drum, and a processing channel formed between at least a portion of the outer wall and at least a portion of the inner wall. The process includes pouring fibrous material to be decomposed into the drum, moving the outer wall relative to the inner wall in a peripheral direction of the drum, and mechanically processing the fibrous material in the processing channel.

In accordance with another feature of the present invention, the fibrous material is predominantly composed of paper fibers.

In accordance with another feature of the present invention, the process includes maintaining an entire degree of filling between 15% and 90% in a free volume of the drum.

In accordance with still another feature of the present invention, the process includes substantially completely filling at least a radial width portion of the processing channel with fibrous material.

In accordance with a further feature of the present invention, the drum is substantially horizontal. Further, the process includes lifting the fibrous material in the processing channel with the contour of the inner wall.

In accordance with a still further feature of the present invention, the process includes transporting the fibrous material exiting the processing channel into a dropping area located within the drum. The process further includes dropping the fibrous material in the dropping area along a dropping level that includes at least one-third of a vertical span of the displacer. Further, the dropping area axially extends only over a portion of a length of the displacer.

In accordance with another feature of the present invention, the process includes adjusting the dry content of the fibrous material in an initial area of the processing channel to be between approximately 10% and 35%.

In accordance with still another feature of the present invention, the process includes executing radial deflection movements with the displacer.

In accordance with another feature of the present invention, the relative moving includes rotating the drum on a center axis and preventing rotation of the displacer. The rotation of the drum produces a centrifugal spinning that is less than an acceleration due to gravity.

In accordance with a further feature of the present invention, the relative moving includes rotating the drum and the displacer in opposite directions. The rotation of the drum produces a centrifugal spinning that is less than an acceleration due to gravity.

In accordance with still another feature of the present invention, the relative moving includes rotating the displacer and preventing rotation of the drum.

In accordance with a still further feature of the present invention, the displacer includes guide elements mounted thereon, and the process includes transporting the fibrous material in an axial direction through the drum. The process also includes altering an axial transport motion the fibrous material through the drum by changing a diagonal positioning of the drum.

In accordance with another feature of the present invention, the installation further includes a pulverizing device positioned within the drum and the pouring of the fibrous material includes inserting at least one of a pressed bale of fibrous material and at least a piece of a pressed bale of fibrous material into the drum and pulverizing the inserted one of the pressed bale and the at least a piece of the pressed bale with the pulverizing device.

In accordance with still another feature of the present invention, the process includes sorting the decomposed fibrous material within the drum, diverting at least one finer fraction of the decomposed fibrous material through at least one screen element, retaining a coarsest fraction of the decomposed fibrous material in the drum, and removing the coarsest fraction from the drum through the second end. The displacer includes a screen portion and the diverting of the at least one finer fraction includes drawing one of the at least one finer fraction radially inward into the displacer through the screen portion. Further, the process includes thinning the one finer fraction in the displacer. Moreover, the process may include thinning the one finer fraction before being drawn radially inward into the displacer.

In accordance with a further feature of the present invention, the drum includes a screen portion and the diverting of the at least one finer fraction includes drawing one of the at least one finer fraction radially outward through the screen portion.

In accordance with another feature of the present invention, the drum includes a first and second disc for closing of the first and second ends, respectively, and at least one of the first and second discs comprising a screen portion and the diverting of the at least one finer fraction includes drawing one of the at least one finer fraction axially outward through the at least one screen portion and moving a screen raker past the at least one screen portion to keep the at least one screen portion free of clogs.

In accordance with still another feature of the present invention, the process includes positioning a rotational axis of the drum substantially vertical.

The present invention is also directed to a device for decomposing a fibrous material that includes a drum having an inner wall and a first and second end, a displacer, having an outer wall with a curved portion over at least one-fourth of its periphery, located within a central area of the drum, an actuator that imparts relative movement between the inner wall and the outer wall, a supply device that inserts the fibrous material at the first end, a removal device that removes the decomposed fibrous material from the drum, and a processing channel between the curved portion of the outer wall and the inner wall.

In accordance with another feature of the present invention, the device includes a removal device for non-fibrous materials.

In accordance with another feature of the present invention, along an axial portion of the displacer, a portion of the outer wall steeply descends from the curved portion and a dropping area is formed between the steeply descending portion and the inner wall. Further, guide elements are mounted to the outer wall at an angle to a peripheral direction of the drum. At least a portion of the guide elements are mounted in processing channel. Further, or alternatively, at least a portion of the guide elements are mounted in the dropping area.

In accordance with a further feature of the present invention, the inner wall is water impermeable over at least an axial portion.

In accordance with a still further feature of the present invention, the drum includes a screen portion coupled to a peripheral portion of the drum.

In accordance with another feature of the present invention, the drum includes a disc that seals the second end, and the disc includes at least one screen portion.

In accordance with a further feature of the present invention, the outer wall includes at least one screen portion.

In accordance with still another feature of the present invention, a rotational axis of the drum is positioned substantially horizontal.

In accordance with yet another feature of the present invention, a rotational axis of the drum being positioned substantially vertical.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein:

FIG. 9 illustrates a vertically standing drum in which the process of the present invention is performed.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
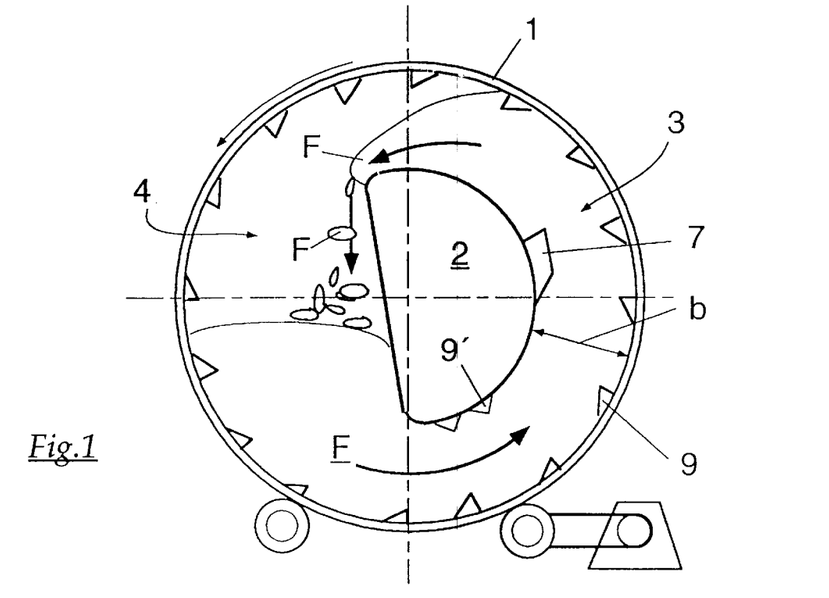
FIG. 1 illustrates a front end view of a drum in which the process of the present invention is performed.

FIG. 1 illustrates a schematic depiction a device for decomposition of fibrous material, e.g., paper. The device includes a drum 1, illustrated here in a view of a front-end. Drum 1 is positioned so that its length is approximately horizontal and is mounted for rotation around its longitudinal axis, as indicated by the directional arrow outside the surface of drum 1. An inside wall of drum 1 may be fitted a plurality of carrier strips 9. Fibrous material F, which is supplied or carried into drum 1, collects in a lower area and is lifted by the rotation of the drum, and thereby, the movement of carrier strips 9. In a center of drum 1, a displacer 2, which has an at least partially cylindrical outer wall, may be positioned, which may be anchored to resist rotational movement. A processing channel 3 may be formed between an outer wall of displacer 2 and the inner wall of drum 1, and on a side of the drum on which fibrous material F is lifted by the drum rotation and carrier strips 9, i.e., in this exemplary illustration, on the right side. Processing channel 3 may have a radial span b that is defined by a distance between the outer wall of displacer 2 and the inner wall of drum 1. Fibrous material F moves upwards by rotation of drum 1 and carrier strips 9, as shown by arrow F1, and then falls downwards after the passing an upper culmination point in a dropping area (distance) 4, as shown by arrow F2. Due to the falling motion of the fibrous material in dropping area 4, at least a coarse pulverization of wet paper is possible. Further, the pulverization effect can be significantly intensified through shearing forces that, in accordance with the present invention, occur in processing channel 3. In an added alternative, brake pieces or tear pieces 9' may be mounted to the outer wall of displacer 2 to further heighten the motion inside the fibrous material, and, therefore, the processing intensity. It is advantageous to space the processing structures in processing channel 3 at distances large enough to prevent a damaging via heavy contaminations or undesired pulverization thereof from occurring. As an alternative, if displacer 2 is rotatably driven, drum 1 could be either not driven, driven in an opposite direction of displacer 2, or driven in a same direction, or even substantially synchronously with displacer 2.

If the process is to continuously run, it is necessary that a constant axial transport movement 8 (see FIG. 2) of fibrous material F occurs through drum 1. For example, drum 1 may be positioned diagonally, rather than horizontally, to take advantage of gravity. Another alternative possibility is to include a worm feed or drive for axially feeding fibrous material F. Still further, transport organs, e.g., diagonally positioned vanes, may be located in the wall of drum 1. As shown in the exemplary illustration, transport motion may be imparted or steered by guide elements 7 mounted to displacer 2. The axial moving effect of guide elements 7 is based upon relative motion occurring, i.e., in the radial direction, between guide elements 7 and fibrous material F. Thus, through correspondingly diagonal positioning, the axial flow of fibrous material F may be steered. It may also be advantageous to adjustably position guide elements 7, i.e., either while the device is at a standstill or, at least a portion of them, while the device is in operation. The adjustment mechanism may be installed, e.g., on displacer 2, which is particularly advantageous when the mechanism is inoperative.

Figure 2:
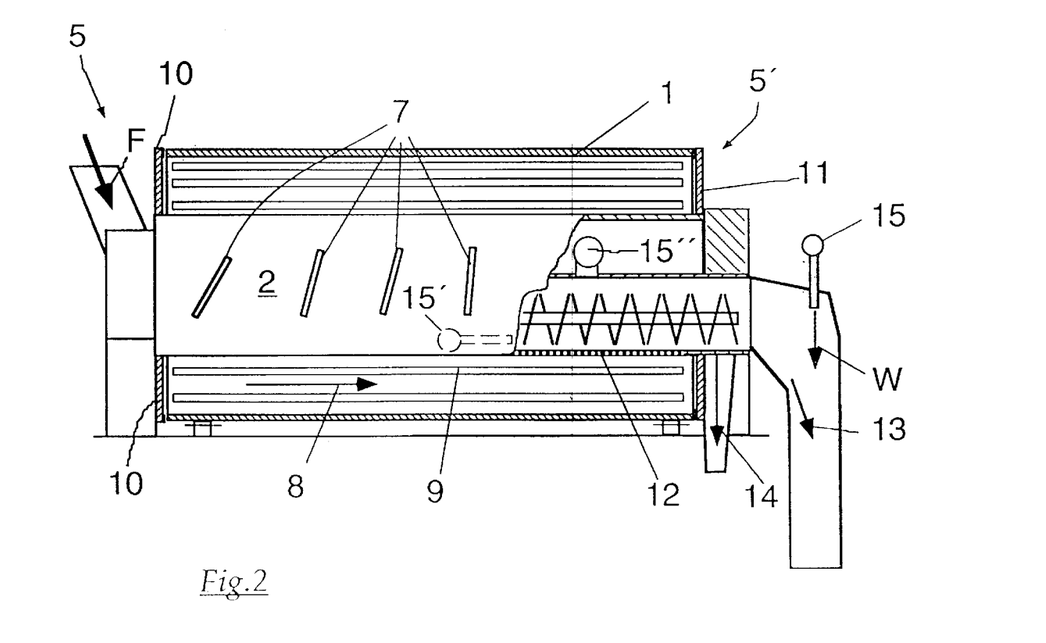
FIG. 2 illustrates a side-view of a drum similar to the one depicted in FIG. 1.

FIG. 2 illustrates a side view of an installation substantially similar to the one depicted in FIG. 1. In order to make displacer 2 visible, an intersected view of drum 1 is shown. Drum 1 is substantially sealed at the ends, e.g., via nonrotating discs 10 and 11. Fibrous material F may be laterally introduced through a large opening (not visible here) in disc 10 from first or front end 5 to be guided through drum 1 in a direction corresponding to axial transport motion 8. In this manner, a combination of decomposition and sorting can performed in a same drum 1. In the exemplary illustration, displacer 2 includes a screen (sieve) element 12 in a downstream portion, to enable a finer fraction 13, in particular, fibrous material, to pass into a chamber for collecting accepted stock in the interior of displacer 2 and which may be diverted axially to one or both sides. Negative pressure may be applied to the chamber for accepted stock. Further, if desired, it is also possible to perform several runs through correspondingly different screen elements from the interior of drum 1. Only a coarsest fraction 14 remains on the second end 5' of drum 1 and may be drawn from drum 1. The perforation in displacer 2 may also begin as early as in an inlet area, i.e., near the first front-end 5.

Water W may be supplied at different places of the decomposing device, e.g., through a water spraying tube 15. This water serves to completely thin the finer fraction 13 of fibrous material F, to facilitate pumping and/or to locally thin the fibrous material F, e.g., in areas of the screen surfaces. In the latter instance, a spraying tube 15', shown in dashed lines inside displacer 2, may be directed toward an inlet area formed by screen element 12. Water may also be applied in a cross-rinsing manner to clear the screen elements or to keep them clear. This may be performed continually or may be performed at timed intervals. Further, a water tube 15" may be utilized to apply a pressure that covers the entire chamber for accepted stock.

While finer fraction 13 in FIG. 2 may be diverted through displacer 2, in an alternative arrangement of the present invention, finer fraction 13 may be diverted through screen element 12' located in the wall of drum 1. Accordingly, water W for rinsing screen element 12' or thinning fibrous material F can be supplied in the area of screen element 12'. Coarsest fraction 14 may held back in drum 1 until the end of the sorting area and then removed from the drum through a contamination removal device 19.

Figure 3:
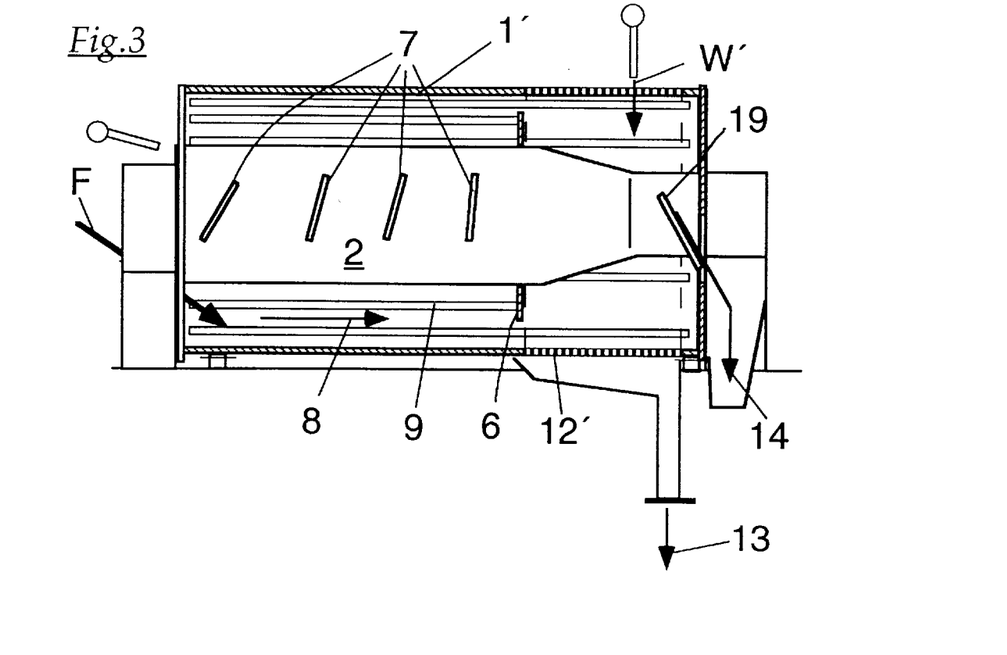
FIGS. 3 and 4 illustrate side views of alternative embodiments for the drum depicted in FIG. 1.

Further, FIG. 3 depicts an advantageous measure for steering the axial transport motion. In particular, on displacer 2 at least one retaining ring 6 is positioned to prevent a premature continuation of the flow, e.g., matter which is not sufficiently decomposed. The at least one retaining ring 6 does not necessarily rotate along with the rest of the device, and it is shaped such that a distance from the at least one retaining ring 6 to the inner wall of drum 1 can be different at various places around the periphery of displacer 2, e.g., smaller on a bottom portion of displacer 2 than on an upper portion of displacer 2. Retaining rings of the type generally discussed above may also be of practical use with other embodiments. In an alternative arrangement, the retaining ring(s) may be coupled to the drum so as to rotate with the rest of the device.

Figure 4:
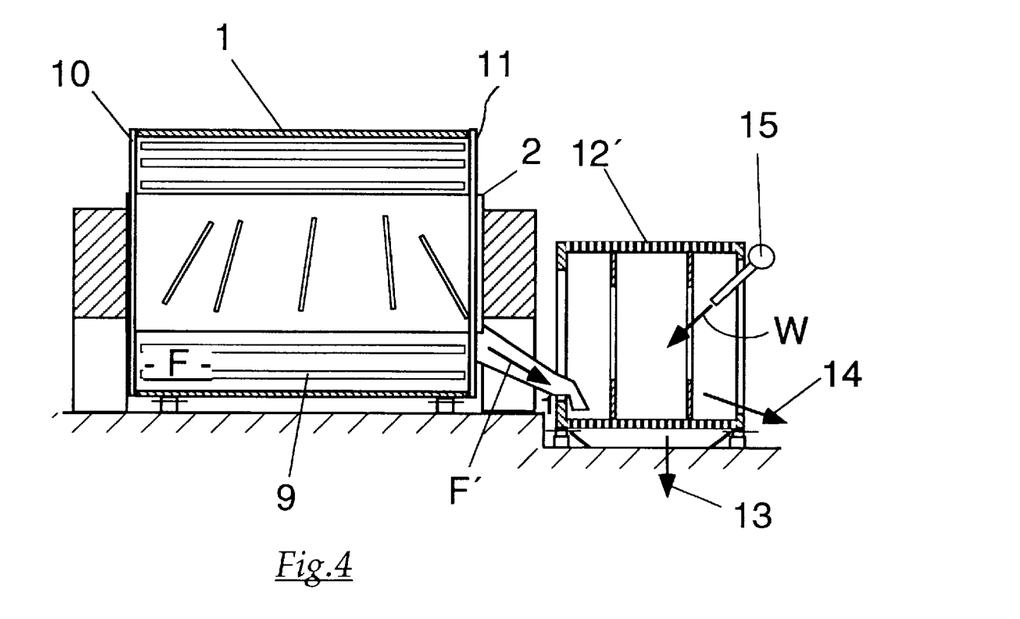

FIG. 4 depicts another alternative arrangement for a decomposing device in accordance with the present invention. In this exemplary illustration, drum 1 performs a purely decomposing function. Accordingly, drum 1 may be considerably shorter, which saves space. This embodiment may be particularly suited for, e.g., lightly contaminated, used paper. In this arrangement, the decomposed, still contaminated fibrous material F' may be introduced or guided into a subsequent sorting drum to separate refuse and paper fibers from each other.

Figure 5:
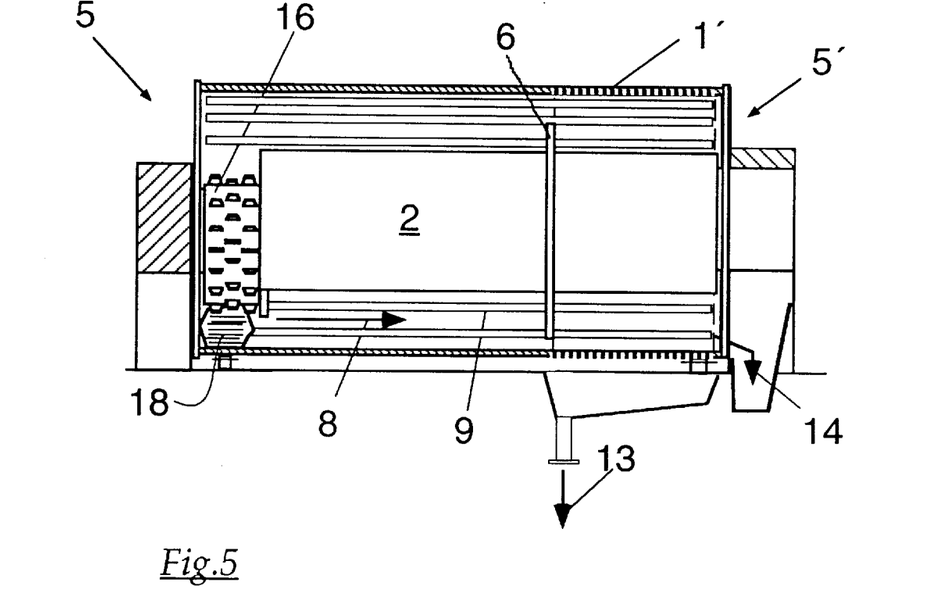
FIG. 5 illustrates a side-view of an alternative embodiment of the drum having bale cutters.
Figure 6:
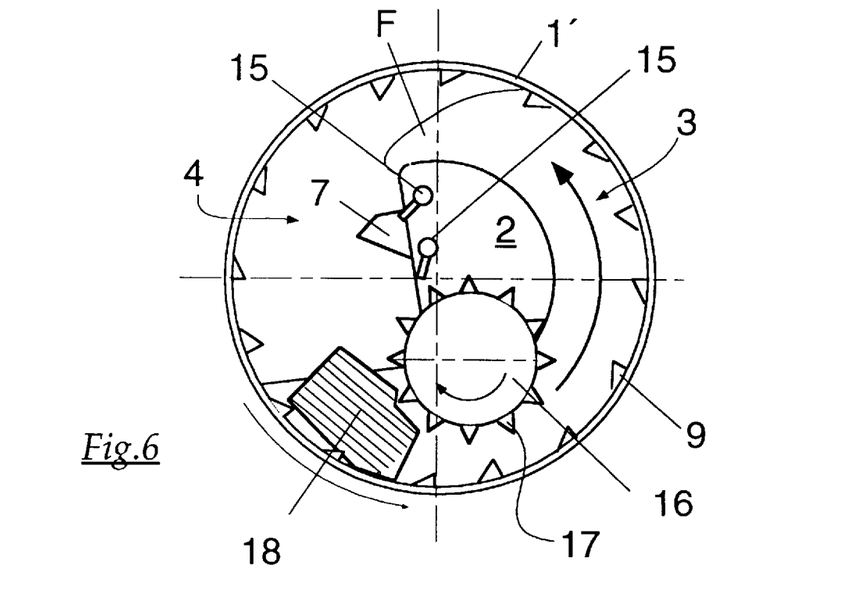
FIG. 6 illustrates a front end view of the drum depicted in FIG. 5.

The fibrous material of the paper that is to be processed in the arrangement depicted in FIG. 4 may be delivered in the form of pressed bales. Even when the baling wires have been removed, the bales produced from the pressing do not simply fall apart. Rather, the entire bale, or at least large pieces of the bale, are guided to drum 1. In order to eliminate the need for a preceding pulverizing machine, e.g., a shredder, first front-end 5 of drum 1 may be located directly behind a feed opening of a bale cutter 16, as illustrated in FIG. 5. For example, a bale cutter may include a horizontally positioned drum that has a plurality of pulverizing elements 17 provided or fitted on its exterior surface. If the drum of bale cutter 16 is propelled to move relative to the paper bales 18 being guided into drum 1, an already immersed and, therefore, soaked paper bale (or paper bale part) splits very easily into shreds or lines. FIG. 6 illustrates an arrangement in which bale cutter 16 substantially prevents bale pieces 18 which are not-yet sufficiently pulverized from reaching processing channel 3. Thus, via the combination of bale cutters and decomposition drum 1, bales can be advantageously processed in accordance with the present invention. Moreover, FIG. 6 shows that guide elements 7 may be mounted, not only inside processing channel 3, but on the facing side located within the vicinity of dropping area 4 of fibrous material F. The arrangement depicted in FIG. 6 has a particular advantage in that guide elements 7 are not located within processing channel 3. In this manner, the high demands that would be placed on guide elements 7 in processing channel 3, thus exposing the guide elements to wear and tear/abrasion, are substantially avoided.

Figure 7:
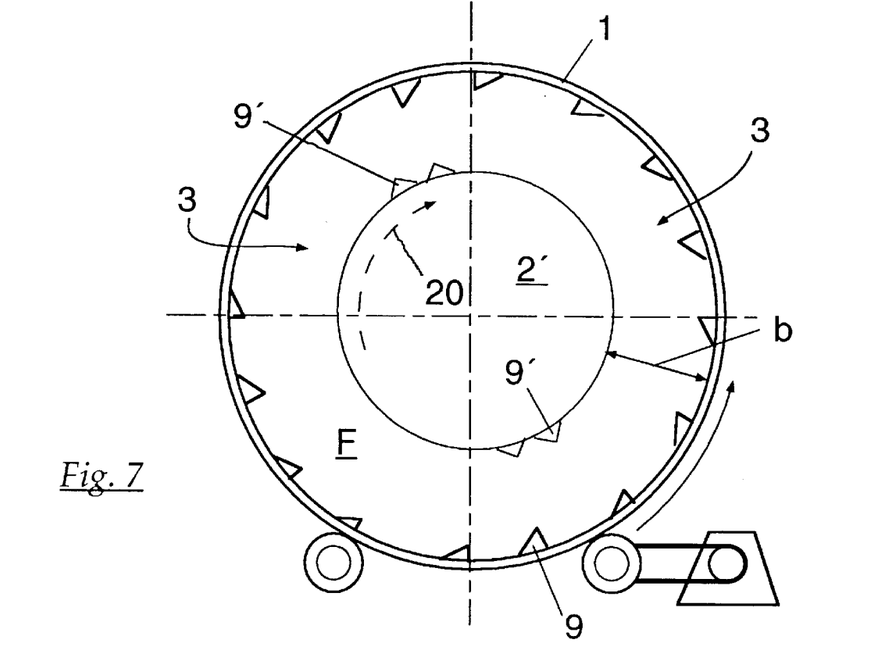
FIG. 7 illustrates another alternative embodiment for the drum.

The arrangement illustrated in FIG. 7 includes a displacer 2', in which, conversely to the arrangement depicted in FIG. 1, a falling distance does not necessarily occur. In this regard, displacer 2' may be formed to have an at least convex, e.g., round, outer wall along at least a portion of its axial extent, so that processing channel 3 may extend over the entire periphery of drum 1. If displacer 2' is propelled, e.g., as depicted by dashed arrow 20, the decomposition effect may be further intensified. In this manner, drum 1 may be maintained in a non-rotating state, or driven in a direction opposite the direction of displacer 2' or in a same direction with displacer 2'. In fact, drum 1 and displacer 2' may be synchronously driven.

Figure 8:
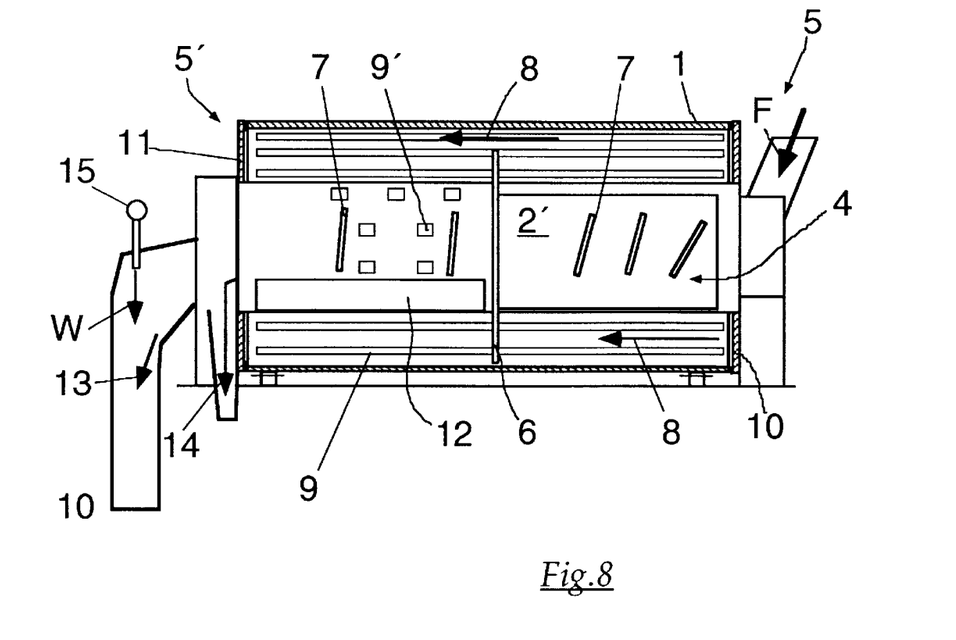
FIG. 8 illustrates a side view of a drum similar to the one depicted in FIG. 7.

FIG. 8 illustrates a side-view of an installation similar to the one depicted in FIG. 7, that includes a view into an area of downstream movement of fibrous material F. In this exemplary illustration, dropping area 4 may be present only on a part of the axial span. In this manner, a combination of initial drop pulverization and subsequent, intensive decomposition in processing channel 3. The subsequent, intensive decomposition in processing channel 3 may extend over the entire periphery. Further, a bale cutter, as depicted in FIGS. 5 and 6, may be positioned either axially before or at a beginning of dropping area 4.

In FIGS. 1–8, only examples are illustrated to explain the process or the suitable devices in accordance with the present invention. In particular, with regard to the shaping of the displacer and the bale cutter, as well as the design of the inner wall of the drum, variations of these features of the present invention are fully within the purview of the ordinarily skilled artisan. Further, it is not necessary that the drum be cylindrical, rather, it may be shaped, e.g., as a polygon or an oval.

In general, a horizontal or a slightly diagonal arrangement of the drum may be the most practical. An arrangement of this type enables drop pulverization of the fibrous material, which in many cases is advantageous. However, a vertically standing, or very diagonally standing, drum may be suitable for the process in accordance with the present invention, when driven in accordance with the above-noted feature.

As an example, FIG. 9 illustrates such an alternative design in which a vertically standing drum is utilized. It is noted that this illustration is schematic and not meant to show the constructive details individually. Vertically standing drum 1 includes a substantially vertically disposed displacer 2. Drum 1 may be opened on its upper front-end, so that fibrous material F can be poured into drum 1 from above. Drum 1 may be put into rotation via an actuator 21, while displacer 2 is held fixed from rotation. The lower end of drum 1 may be closed off by a disc 11 that includes an outlet 19 for accepted stock. Drum 1 should rotatably supported in by supports 20, which are only schematically represented in the drawing. In this embodiment, fibrous material F is decomposed on its axial path from above to below, such that a pulverizing effect by the shearing forces appearing between drum 1 and displacer 2 is required. Drum 1 may be filled completely up to the upper inlet area with fibrous material. In the lower area, i.e., prior to outlet 19 for accepted stock, thinning water may be supplied to facilitate removal. For this, a spraying tube 15' may be mounted in displacer 2. The details which are depicted in the other figures for further development of the process are not illustrated here, however, those ordinarily skilled in the art will realize that those features may be incorporated into the vertical drum arrangement.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for decomposing fibrous material in an installation including a drum having an inner wall, a first end, and a second end, a displacer, which is mounted to resist rotation, having an at least partially cylindrical outer wall positioned inside the drum, and a processing channel formed between at least a portion of the at least partially cylindrical outer wall and at least a portion of the inner wall, the process comprising:

pouring fibrous material to be decomposed into the drum;

rotating the at least partially cylindrical outer wall relative to the inner wall in a peripheral direction of the drum, wherein the at least partially cylindrical outer wall resists rotation; and mechanically processing the fibrous material in the processing channel.

2. The process in accordance with claim 1, wherein the fibrous material is predominantly composed of paper fibers.

3. The process in accordance with claim 1, further comprising:

maintaining an entire degree of filling between 15% and 90% in a free volume of the drum.

4. The process in accordance with claim 1, further comprising:

substantially completely filling at least a radial width portion of the processing channel with fibrous material.

5. The process in accordance with claim 1, wherein the drum is substantially horizontal.

6. The process in accordance with claim 5, further comprising:

lifting the fibrous material in the processing channel with the contour of the inner wall.

7. The process in accordance with claim 5, further comprising:

transporting the fibrous material exiting the processing channel into a dropping area located within the drum.

8. The process in accordance with claim 7, further comprising:

dropping the fibrous material in the dropping area along a dropping level that includes at least one-third of a vertical span of the displacer.

9. The process in accordance with claim 7, wherein the dropping area axially extends only over a portion of a length of the displacer.

10. The process in accordance with claim 1, further comprising:

adjusting the dry content of the fibrous material in an initial area of the processing channel to be between approximately 10% and 35%.

11. The process in accordance with claim 1, further comprising:

executing radial deflection movements with the displacer.

12. The process in accordance with claim 1, the relative moving comprising rotating the drum on a center axis and preventing rotation of the displacer.

13. The process in accordance with claim 12, wherein the rotation of the drum produces a centrifugal spinning that is less than an acceleration due to gravity.

14. The process in accordance with claim 1, the displacer comprising guide elements mounted thereon; and the process further comprising:

transporting the fibrous material in an axial direction through the drum.

15. The process in accordance with claim 14, further comprising:

altering an axial transport motion the fibrous material through the drum by changing a diagonal positioning of the drum.

16. The process in accordance with claim 1, wherein the installation further includes a pulverizing device positioned within the drum; and the pouring of the fibrous material comprising:

inserting at least one of a pressed bale of fibrous material and at least a piece of a pressed bale of fibrous material into the drum; and pulverizing the inserted one of the pressed bale and the at least a piece of the pressed bale with the pulverizing device.

17. The process in accordance with claim 1, further comprising:

sorting the decomposed fibrous material within the drum;

diverting at least one finer fraction of the decomposed fibrous material through at least one screen element;

retaining a coarsest fraction of the decomposed fibrous material in the drum; and removing the coarsest fraction from the drum through the second end.

18. The process in accordance with claim 17, wherein the displacer including a screen portion; and the diverting of the at least one finer fraction comprising:

drawing one of the at least one finer fraction radially inward into the displacer through the screen portion.

19. The process in accordance with claim 18, further comprising:

thinning the one finer fraction in the displacer.

20. The process in accordance with claim 18, further comprising:

thinning the one finer fraction before being drawn radially inward into the displacer.

21. The process in accordance with claim 17, wherein the drum including a screen portion; and the diverting of the at least one finer fraction comprising:

drawing one of the at least one finer fraction radially outward through the screen portion.

22. The process in accordance with claim 17, wherein the drum including a first and second disc for closing of the first and second ends, respectively, and at least one of the first and second discs comprising a screen portion; and the diverting of the at least one finer fraction comprising:

drawing one of the at least one finer fraction axially outward through the at least one screen portion; and moving a screen raker past the at least one screen portion to keep the at least one screen portion free of clogs.

23. The process in accordance with claim 1, wherein the drum is substantially vertical.

24. A device for decomposing a fibrous material comprising:

a drum having an inner wall and a first and second end;

a displacer, having an at least partially cylindrical outer wall with a curved portion over at least one-fourth of its periphery, located within a central area of the drum, the displacer being mounted to resist rotation;

an actuator that imparts relative movement between the inner wall and the at least partially cylindrical outer wall;

a supply device that inserts the fibrous material at the first end;

a removal device that removes the decomposed fibrous material from the drum; and a processing channel between the curved portion of the at least partially cylindrical outer wall and the inner wall.

25. The device in accordance with claim 24, further comprising a removal device for non-fibrous materials.

26. The device in accordance with claim 24, along an axial portion of the displacer, a portion of the outer wall steeply descends from the curved portion; and a dropping area being formed between the steeply descending portion and the inner wall.

27. The device in accordance with claim 26, further comprising guide elements mounted to the outer wall at an angle to a peripheral direction of the drum.

28. The device in accordance with claim 27, at least a portion of the guide elements being mounted in processing channel.

29. The device in accordance with claim 27, at least a portion of the guide elements being mounted in the dropping area.

30. The device in accordance with claim 24, the inner wall being water impermeable over at least an axial portion.

31. The device in accordance with claim 24, the drum including a screen portion coupled to a peripheral portion of the drum.

32. The device in accordance with claim 24, the drum including a disc that seals the second end; and the disc comprising at least one screen portion.

33. The device in accordance with claim 24, the outer wall including at least one screen portion.

34. The device in accordance with claim 24, a rotational axis of the drum being positioned substantially horizontal.

35. The device in accordance with claim 24, a rotational axis of the drum being positioned substantially vertical.

* * * * *